United States Patent
Grethe et al.

[15] 3,666,763
[45] May 30, 1972

[54] 4-PHENYL ISOQUINOLINES AND PROCESS FOR PREPARING SAME

[72] Inventors: Guenter Grethe, 3 Andover Drive, North Caldwell, N.J. 07006; Milan Radoje Uskokovic, 7 Windermere Road, Upper Montclair, N.J. 07043

[73] Assignee: Hoffman-La Roche Inc. Nutley, N.J.

[22] Filed: Jan. 6, 1970

[21] Appl. No.: 1,062

Related U.S. Application Data

[63] Continuation-in-part of Ser. No. 830,125, June 3, 1969, abandoned.

[52] U.S. Cl. ............260/289 R, 260/283, 260/286 Q, 260/286 R, 424/258
[51] Int. Cl. .............................................C07d 35/10
[58] Field of Search ...................................260/289

[56] References Cited

UNITED STATES PATENTS

| | | | |
|---|---|---|---|
| 2,759,936 | 8/1956 | Speeter | 260/288 R |
| 3,393,198 | 7/1968 | Unger et al. | 260/286 |
| 3,457,266 | 7/1969 | Gibas | 260/289 |
| 3,553,218 | 1/1971 | Unger et al. | 260/289 |

FOREIGN PATENTS OR APPLICATIONS

| | | | |
|---|---|---|---|
| 1,164,192 | 9/1969 | Great Britain | 260/288 |

OTHER PUBLICATIONS

Hinton et al., Chem. Abstr. Vol. 53, Col. 15082– 15085 (1959)

*Primary Examiner*—Donald G. Daus
*Attorney*—Samuel L. Welt, Jon S. Saxe, Bernard S. Leon and William G. Isgro

[57] ABSTRACT

Substituted 4-phenylisoquinolines prepared from the correspondingly substituted 4-phenyl-4-isoquinolinols are described. The end products are useful as antidepressants and hypotensive agents.

10 Claims, No Drawings

4-PHENYL ISOQUINOLINES AND PROCESS FOR PREPARING SAME

Cross-Reference to Related Applications

This application is a continuation-in-part application of copending application, Ser. No. 830,125, filed June 3, 1969 in the names of Grethe and Uskokovic and now abandoned.

DESCRIPTION OF THE INVENTION

This invention relates to novel 1,2,3,4-tetrahydro-4-phenyl isoquinolines, novel intermediates therefor and processes of making the foregoing.

The novel 1,2,3,4-tetrahydro-4-phenylisoquinolines to which the invention relates are selected from the group consisting of compounds of the formula

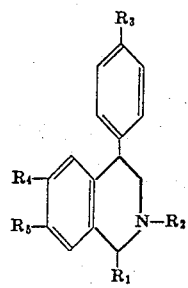

(I)

wherein $R_1$ is selected from the group consisting of hydrogen and lower alkyl;

$R_2$ is selected from the group consisting of hydrogen, lower alkyl and benzyl;

$R_3$ is selected from the group consisting of hydrogen and lower alkyl;

$R_4$ is selected from the group consisting of hydrogen and lower alkoxy;

and $R_5$ is selected from the group consisting of hydrogen, halogen, hydroxy and lower alkoxy;

at least one of $R_1$–$R_5$ being other than hydrogen and the pharmaceutically acceptable acid addition salts thereof.

Further, this invention relates to novel processes for the preparation of the compounds of formula I. More specifically, this invention relates to novel methods for the preparation of compounds of formula I from the corresponding 1,2,3,4-tetrahydro-4-phenyl-4-isoquinolinols of the following formula:

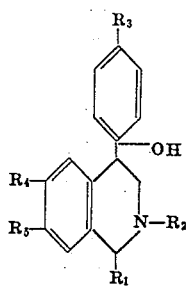

(II)

wherein $R_1$–$R_5$ are as described above.

As used herein, the term "lower alkyl" denotes a hydrocarbon group containing one to seven carbon atoms, preferably from one to four carbon atoms, such as, for example, methyl, ethyl, propyl, isopropyl, butyl and the like; methyl is preferred. The term "lower alkoxy" denotes a lower alkyl ether group in which the lower alkyl moiety is as described above, such as methoxy, ethoxy, propoxy and the like, with methoxy being preferred. As used herein, the term "halogen" denotes all four forms thereof unless specified otherwise, i.e. fluorine, chlorine, bromine and iodine, with chlorine being preferred.

A preferred group of compounds falling within the scope of formula I are those wherein $R_4$ is hydrogen and $R_5$ is lower alkoxy or hydroxy, i.e. compounds of the formula

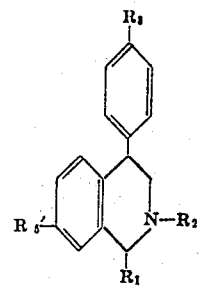

wherein $R_1$–$R_3$ are as described above and
$R_5'$ is lower alkoxy or hydroxy.

The most preferred of the compounds of formula I are:
1,2,3,4-tetrahydro-7-methoxy-4-phenylisoquinoline;
1,2,3,4-tetrahydro-7-methoxy-2-methyl-4-phenylisoquinoline;
1,2,3,4-tetrahydro-7-methoxy-1,2,-dimethyl-4-phenylisoquinoline;
1,2,3,4-tetrahydro-7-methoxy-2-methyl-4-(4-tolyl)-isoquinoline
and 1,2,3,4-tetrahydro-7-hydroxy-2-methyl-4-phenylisoquinoline.

Certain of the substituted 4-phenylisoquinolines referred to above may be obtained in the form of their acid addition salts. In a most preferred embodiment these salts are formed with pharmaceutically acceptable acid groups. These salts may be prepared from the free base forms of the substituted 4-phenylisoquinolines by methods well known in the art. Examples of such pharmaceutically acceptable acid groups include those of inorganic and organic acids, such as hydrochloric acid, hydrobromic acid, sulfuric acid, acetic acid, succinic acid and the like. In addition, the non-pharmaceutically acceptable acid salts of the above 1,2,3,4-tetrahydro-4-phenylisoquinoline compounds are useful as intermediates in the preparation of pharmaceutically acceptable acid addition salts of said compounds by salt exchange methods or by conversion of the non-acceptable salt to the free base followed by formation of the salt using a pharmaceutically acceptable acid. Both such methods of converting the pharmaceutically non-acceptable salt to the pharmaceutically acceptable form utilize procedures well known in the art.

The compounds of formula I may be prepared by several methods. In one such method, the 1,2,3,4-tetrahydro-4-phenyl-4-isoquinolinols of formula II are catalytically hydrogenated to yield the desired compounds of formula I. The present inventors have found that treatment of the compounds of formula II with a catalytic hydrogenating agent in an acidic media accomplishes removal of the tertiary hydroxy group of the isoquinolinols to yield the compounds of formula I.

Following the method discussed above, the substituted 4-phenyl-4-isoquinolinols of formula II are prepared from the corresponding 2,3,-dihydro-4(1H)-isoquinolones of the following formula:

(III)

wherein $R_1$, $R_2$, $R_4$ and $R_5$ are as described above.

The compounds of formula III above are reacted with appropriately substituted Grignard reagents such as, for example, substituted phenylmagnesium halogenides of the following formula:

(IV)

wherein X is chlorine, bromine or iodine and R$_3$ is as described above
and substituted phenyllithium salts of the formula

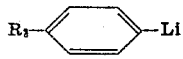

wherein R$_3$ is as described above.

The reaction between the isoquinolones of formula III and the Grignard reagents of formulas IV and IV-a yields the 1,2,3,4-tetrahydro-4-phenyl-4-isoquinolinols of formula II.

The 1,2,3,4-tetrahydro-4-phenyl-4-isoquinolinols characterized by formula II are then used in the preparation of the desired substituted 4-phenylisoquinolines of formula I. This preparation is accomplished by removal of the tertiary hydroxy group of the isoquinolinols by catalytic hydrogenation of the free bases or hydrochlorides of said compounds in an acidic media. For the purposes of this invention, acidic solvents such as glacial acetic acid, hydrochloric acid at varying concentrations, ethanolic hydrogen chloride, and isopropanolic hydrogen chloride may be used to create the acidic media in which the hydrogenation reaction takes place, with glacial acetic acid or 6N HCl the most preferred acidic solvents. In accomplishing the hydrogenation of the compounds of formula II, any conventional hydrogenation catalyst can be used, with platinum oxide, a mixture of platinum oxide and platinum black, rhodium (5 percent) on alumina, rhodium (5 percent) on carbon, and palladium (10 percent) on carbon being the most preferred. The reaction conditions employed include a temperature in the range of from about room temperature to about 80° C., with a range between 50°–70° being preferred, and a pressure ranging from atmospheric pressure to 300 psi, depending upon the requirements of the reactants.

An alternate method of preparing the desired substituted 4-phenyl-isoquinolines can be employed based upon the facile disproportionation of the corresponding 1,2-dihydroisoquinolines and the selective reduction of the resulting isoquinolinium salts.

Following this alternate method, compounds of formula II, bearing a benzyl group as the R$_2$ substituent, are treated with a suitable acidic solvent. Examples of the acidic solvents that may be employed are hydrochloric acid, glacial acetic acid, ethanolic hydrogen chloride, isopropanolic hydrogen chloride or mixtures of these acids, as for example, a mixture of glacial acetic acid and hydrogen chloride. In this acidic medium, the compounds of formula II bearing a benzyl group as the R$_2$ substituent, are dehydrated to the corresponding 1,2-dihydroisoquinolines, which disproportionate to produce a crude reaction product containing a mixture of the 2-benzyl-1,2,3,4-tetrahydro-4-phenylisoquinolines and the 2-benzyl-4-phenylisoquinolinium salts. The isoquinolinium salts that result from the disproportionation may be characterized by the following formula:

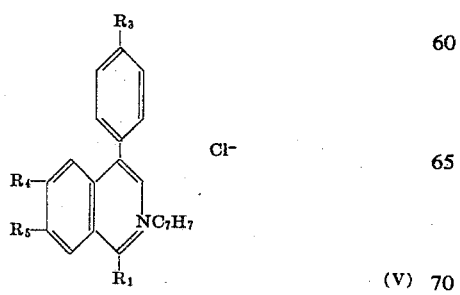

(V)

wherein R$_1$, R$_3$R$_5$ are as described above.

The compounds of formula V contained in the crude reaction product can then be converted to the desired compounds of formula I by several different approaches. Each approach is of value because it does not require separation of the materials contained in the crude reaction product before further treatment.

In one such approach, the compounds of formula V contained in the crude reaction product may be reduced by treatment with a metal hydride, for example, an alkali metal hydride such as sodium borohydride or lithium aluminum hydride, with sodium borohydride being preferred, in an alcoholic solvent such as methanol, ethanol and the like. The reduction reaction yields a pure reaction product of the 2-benzyl-1,2,3,4-tetrahydro-4-penyl-isoquinolines. Following another possible approach, the compounds of formula V contained in the crude reaction product may be treated with a mild catalytic hydrogenating agent such as, for example, platinum oxide, to yield the 2-benzyl-1,2,3,4-tetrahydro-4-phenyl-isoquinolines. In either case, if desirable, the benzyl group appearing at the R$_2$-position of the 1,2,3,4-tetrahydro-4-phenylisoquinolines can be removed by hydrogenolytic debenzylation. In a third approach, the compounds of formula V contained in the crude reaction product may be treated with a stronger catalytic hydrogenting agent, such as, for example, palladium (10 percent) on carbon, to accomplish hydrogenation and debenzylation in one step to yield the 1,2,3,4-tetrahydro-4-phenyl-isoquinolines directly.

A number of compounds embraced by formula I are optically active. These optically active 1,2,3,4-tetrahydro-4-phenyl-isoquinolines may be prepared by several different methods. One such method involves heating an appropriately substituted racemic 1,2,3,4-tetrahydro-4-phenyl-iosquinoline with (-)di-O-isopropylidene-2-keto-L-gulonic acid hydrate (DAG) in an organic solvent such as ethanol causing resolution of the racemic compound into the two antipodes.

The 1,2,3,4-tetrahydro-4(S)-phenyl-isoquinoline-DAG complex of the following formula

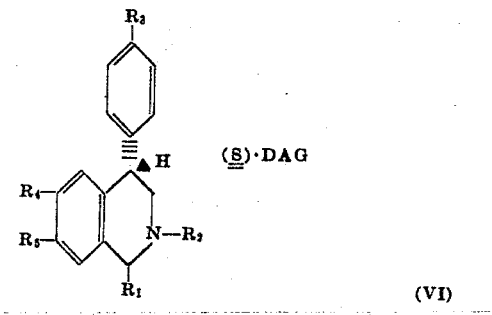

(VI)

wherein R$_1$–R$_5$ are as described above crystallizes from solution while the 4(R) antipode remains in the mother liquor. The 1,2,3,4-tetrahydro-4(S)-phenylisoquinoline-DAG complex of formula VI which has crystallized out is then decomposed by addition of a concentrated base such as ammonium hydroxide, to produce the optically active 1,2,3,4-tetrahydro-4 (S)-phenylisoquinoline of the following formula:

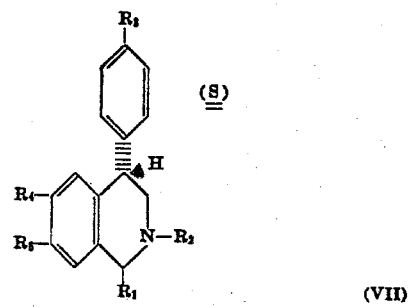

(VII)

wherein R$_1$–R$_5$ are as described above.

If desirable, the 4(R) antipode can be crystallized from the mother liquor using dibenzoyl-d-tartaric acid (d-DBT) as a crystallizing agent, producing the 1,2,3,4-tetrahydro-4(R)-phenylisoquinoline-deDBT complex of the following formula:

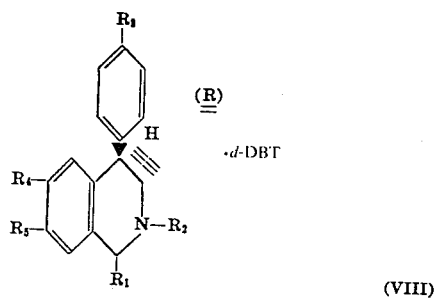

(VIII)

wherein R₁–R₅ are as described above.

In an alternate method, the optically active compounds of formula I can be prepared by dissolving an appropriately substituted racemic 1,2,3,4-tetrahydro-4-phenylisoquinoline in 0,0-dibenzoyl-d-or-l-tartaric acid (d or l — DBT) resulting in the resolution of the racemic compound into the optically active 4(R) and (S) antipodes. The 1,2,3,4-tetrahydro-4(R)-phenylisoquinoline-d-DBT complex of formula VIII crystallizes from the solution while the 1,2,3,4-tetrahydro-4(S)-phenylisoquinoline-l-DBT complex remains in the mother liquor. A suspension of the complex of formula VIII in water is then rendered alkaline, for example, with sodium hydroxide and extracted with ether or chloroform to produce the optically active 4(R) antipode of the formula

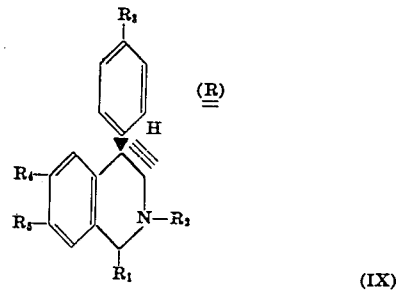

(IX)

wherein R₁–R₅ are as described above.

To obtain the optically active 4(S) antipode, the mother liquor containing the 1,2,3,4-tetrahydro-4(S)-phenylisoquinoline-l-DBT complex is rendered alkaline and extracted several times with ether. Upon evaporation of the etheral layer under reduced pressure, the 4(S) antipode of formula VII is obtained.

The compounds of formula I and their pharmaceutically acceptable salts are extremely effective and active as antidepressants and hypotensive agents. Their useful antidepressant activity is shown in warm-blooded animals utilizing the standard ptosis-anti-tetrabenazine test. In this test, a group of 6 mice is treated with the test compound at standard intraperitoneal doses of 1 and 3 or 3 and 10 mg/kg respectively, 45 minutes prior to intraperitoneal injection of 50 mg/kg of tetrabenazine. Ptosis is determined by changes in collonic temperature. The collonic temperature is read one hour after tetrabenazine injection. The $ED_{50}$ is at doses at which ptosis is prevented in three of the six mice. Utilizing this standard procedure, compounds such as 1,2,3,4-tetrahydro-7-methoxy-1,2-dimethyl-4-phenylisoquinoline hydrochloride and 1,2,3,4-tetrahydro-7-methoxy-2-methyl-4-phenylisoquinoline hydrochloride show an $ED_{50}$ of 0.5 mg/kg and 1 mg/kg respectively, indicating that these compounds exhibit marked antidepressant activity.

As indicated above, the compounds of formula I are also useful as hypotensive agents. Their useful hypotensive activity is demonstrated in warm-blooded animals employing a standard blood pressure screen. This test utilizes one anesthetized dog. The carotid arterial blood pressure and respiration are recorded. A series of control responses of blood pressure and respiration are first obtained and then duplicated. After the controls are run the drug to be tested is intravenously administered slowly over a period of 5 minutes at a dose not exceeding 10 mg/kg. The injection is terminated as a definite change in blood pressure occurs. Utilizing this standard procedure, compounds such as 1,2,3,4-tetrahydro-7-methoxy-2-methyl-4-(4-tolyl)-isoquinoline hydrochloride and 1,2,3,4-tetrahydro-7-methoxy-4-(4-tolyl)-isoquinoline hydrochloride at a dosage of 4 mg/kg produced a prolonged pressure decrease.

The compounds of formula I can be used in the form of conventional pharmaceutical preparations. For example, said compounds can be mixed with conventional organic or inorganic inert pharmaceutical carriers suitable for parenteral or enteral administration such as, for example, water, gelatin, starch, magnesium stearate, petroleum jelly or the like. They can be administered in conventional pharmaceutical forms, for example, solid forms such as capsules, tablets or suppositories or liquid forms such as solution or emulsions.

The following non-limiting examples further illustrate the invention. All temperatures are in degrees Centigrade, unless otherwise mentioned.

EXAMPLE 1

Preparation of 2-benzyl-1,2,3,4-tetrahydro-7-methoxy-4-phenyl-4-isoquinolinol hydrochloride To 3 g. of dry magnesium turnings covered with 20 ml. of anhydrous tetrahydrofuran, 22 g. of bromobenzene in 20 ml. of anhydrous tetrahydrofuran were added. Stirring and gentle refluxing were continued for an hour to complete the formation of the Grignard reagent. Thereafter, a solution containing 25 g. of 2-benzyl-2,3-dihydro-7-methoxy-4(1H)-isoquinolone in 200 ml. of anhydrous tetrahydrofuran was added. After 2 hr. at reflux, the reaction mixture was cooled, poured into an ice-cold saturated solution of ammonium chloride and extracted several times with ether. The residue was dissolved in ether and the insoluble portion was removed by filtration. After treating the filtrate with an excess of isopropanolic hydrogen chloride, 32 g. of crystalline 2-benzyl-1,2,3,4-tetrahydro-7-methoxy-4-phenyl-4-isoquinolinol hydrochloride was obtained, melting point 206°–208°.

EXAMPLE 2

Preparation of 2-benzyl-1,2,3,4-tetrahydro-7-methoxy-4(4-tolyl)-4-isoquinolinol hydrochloride To 4.5 g. of dry magnesium turnings covered with 15 ml. of anhydrous tetrahydrofuran, was added a solution containing 45 g. of p-bromotoluene in 45 ml. of anhydrous tetrahydrofuran. Stirring and gentle refluxing were continued for an hour to complete the formation of the Grignard reagent. A solution containing 35 g. of 2-benzyl-2,3-dihydro-7-methoxy-4(1H)-isoquinolone in 500 ml. anhydrous tetrahydrofuran was added dropwise to the stirred Grignard reagent. After the addition was complete, the mixture was kept at reflux for 2.5 hr., was cooled and poured into an ice-cold saturated aqueous solution of ammonium chloride. The mixture was extracted three times with ether. The combined ether extracts were worked up in the known manner and the residue was dissolved in methanol. Addition of isopropanolic hydrogen chloride to the solution gave 30 g. crystalline 2-benzyl-1,2,3,4-tetrahydro-7-methoxy-4(4-tolyl)-4-isoquinolinol hydrochloride, melting point 200°–202°.

EXAMPLE 3

Preparation of 1,2,3,4-tetrahydro-7-methoxy-1,2-dimethyl-4-phenyl-4-isoquinolinol hydrochloride To 0.9 g. of dry magnesium turnings covered with 5 ml. of anhydrous ether, 9 g. of bromobenzene in 15 ml. of anhydrous ether were added. Stirring and gentle refluxing were continued for an hour to complete the formation of the Grignard reagent. Thereafter, a solution containing 5.3 g. of 1,2-dimethyl-2,3-dihydro-7-methoxy-4(1H)-isoquinolone in 15 ml. of anhydrous ether was added. The reaction mixture was refluxed for 1 hr. and then cooled to room temperature. Methanol was carefully added and the reaction mixture was stirred for 30 minutes. The mixture was filtered. The precipitate was washed several times with ether. Upon addition of excess isopropanolic hydrogen chloride to the filtrate, 7.5 g. of crystalline 1,2,3,4-tetrahydro-7-methoxy-1,2-dimethyl-4-phenyl-4-isoquinolinol hydrochloride, melting point 184°–187°, were obtained. An analytical sample melted at 199°–200° after three recrystallizations from isopropanol/methanol.

EXAMPLE 4

Preparation of 2-benzyl-1,2,3,4-tetrahydro-7-methoxy-1-methyl-4-phenyl-4-isoquinolinol hydrochloride To 1.5 g. of dry magnesium turnings covered with 15 ml. of anhydrous ether, 11 g. of bromobenzene in 20 ml. of anhydrous ether were added. Stirring and gentle refluxing were continued for an hour to complete the formation of the Grignard reagent. Then a solution containing 11.6 g. of 2-benzyl-2,3-dihydro-7-methoxy-1-methyl-4(1H)-isoquinolone in 30 ml. of anhydrous ether was added. After 2 hr. at reflux, the reaction mixture was cooled to room temperature and methanol was carefully added. The insoluble parts were collected by filtration and washed several times with ether. Addition of excess isopropanolic hydrogen chloride to the filtrate afforded 12 g. of crystalline 2-benzyl-1,2,3,4-tetrahydro-7-methoxy-1-methyl-4-phenyl-4-isoquinolinol hydrochloride, melting point 202°–205°, which after recrystallization from methanol had a melting point of 211°–212°.

EXAMPLE 5

Preparation of 2-benzyl-7-chloro-1,2,3,4-tetrahydro-4-phenyl-4-isoquinolinol hydrochloride To a Grignard solution prepared as previously described from 3.12 g. of magnesium and 23.6 g of bromobenzene in 40 ml. of anhydrous tetrahydrofuran, was added dropwise a solution containing 27.2 g. of 2-benzyl-7-chloro-2,3-dihydro-4(1H)-isoquinolone in 200 ml. of anhydrous tetrahydrofuran within 40 minutes. After the addition was completed, the mixture was kept at reflux for 6 hr. and thereafter stirred at room temperature overnight. To the mixture was added carefully a saturated aqueous solution of sodium sulfate. The organic layer was separated and the aqueous solution was extracted twice with ether. The residue after usual work-up was dissolved in methanol and treated with an excess of isopropanolic hydrogen chloride. The 2-benzyl-7-chloro-1,2,33,4-tetrahydro-4-phenyl-4-isoquinolinol hydrochloride was collected as a crystalline precititate by filtration and had a melting point of 258°–261°.

EXAMPLE 6

Preparation of 2-benzyl-7-chloro-1,2,3,4-tetrahydro-4-(4-tolyl)-4-isoquinolinol hydrochloride To a Grignard solution prepared as previously described from 0.945 g of magnesium and 7.7 g of p-bromotoluene in 12 ml. anhydrous tetrahydrofuran, was added dropwise a solution containing 8.15 g. of 2-benzyl-7-chloro-2,3-dihydro-4(1H)-isoquinolone in 60 ml. of anhydrous tetrahydrofuran. Upon completion of the addition, the mixture was kept at reflux for 5.5 hr., and then left standing at room temperature for 15 hr. A saturated aqueous solution of sodium sulfate was added carefully to the mixture, which after dilution with water was extracted several times with chloroform. The oily residue obtained from the combined organic extracts after the usual work-up was dissolved in methanol. The addition of excess isopropanolic hydrogen chloride yielded a crystalline precipitate which was immediately collected by filtration and recrystallized from methanol to give 5.1 g. ofcrystalline 2-benzyl-7-chloro-1,2,3,4-tetrahydro-4-(4-tolyl)-4-isoquinolinol hydrochloride, melting point 242°–243°.

EXAMPLE 7

Preparation of 2-benzyl-7-chloro-1,2,3,4-tetrahydro-4-(4-methoxyphenyl)-4-isoquinolinol hydrochloride The Grignard reagent was prepared as previously described from 0.365 g. of magnesium and 3.02 g. of p-bromoanisole in 4 ml. of anhydrous tetrahydrofuran. After a solution containing 2.72 g. of 2-benzyl-7-chloro-2,3-dihydro-4(1H)-isoquinolone in 20 ml. of anhydrous tetrahydrofuran was added to the Grignard reagent, the mixture was heated at reflux temperature for 4.5 hr. and allowed to stand at room temperature overnight. A saturated aqueous solution of sodium sulfate was added and the mixture was extracted three times with chloroform. The combined organic extracts after the usual work-up gave an oily residue which was dissolved in ethanol and treated with excess isopropanolic hydrogen chloride. The crystalline precipitate which formed was collected by filtration and recrystallized from methanol to give 907 mg. crystalline 2-benzyl-7-chloro-1,2,3,4-tetrahydro-4-(4-methoxyphenyl)-4-isoquinolinol hydrochloride, melting point 217°–218°.

EXAMPLE 8

Preparation of 1,2,3,4-tetrahydro-7-methoxy-4-phenylisoquinoline hydrochloride

A. To a solution containing 5.6 g of 2-benzyl-1,2,3,4-tetrahydro-7-methoxy-4-phenyl-4-isoquinolinol in 120 ml. of glacial acetic acid was added 0.8 g. of 10 percent palladium-on-charcoal catalyst. The mixture was hydrogenated at 60° and 50 psi for 15 hr. Thereafter, the catalyst was removed by filtration and the filtrate was evaporated to dryness under reduced pressure. The residue was dissolved in ethanol and, upon addition of isopropanolic hydrogen chloride to the solution, a crystalline product was obtained which, after recrystallization from ethanol, gave 2.4 g. of 1,2,3,4-tetrahydro-7-methoxy-4-phenlisoquinoline hydrochloride, melting point 210°–212°.

B. To a solution containing 2 g. of 2-benzyl-1,2,3,4-tetrahydro-7-methoxy-4-phenyl-4-isoquinolinol hydrochloride in 100 ml. of 6N hydrochloric acid was added 0.5 g. of 10 percent palladium-on-carbon. The mixture was hydrogenated at 70° and atmospheric pressure for 7 hr. Work-up of the reaction mixture as under (A) yielded crystalline 1,2,3,4-tetrahydro-7-methoxy-4-phenylisoquinoline hydrochloride, melting point 210°–211°.

EXAMPLE 9

Preparation of 2-benzyl-1,2,3,4-tetrahydro-7-methoxy-4-(4-tolyl)-isoquinoline hydrochloride A solution containing 3 g. of 2-benzyl-1,2,3,4-tetrahydro-7-methoxy-4-(4-tolyl)-4-isoquinolinol hydrochloride in 30 ml. of 20 percent isopropanolic hydrogen chloride was heated at reflux for 1.5. hr. After removal of the solvent under reduced pressure, the residue was dissolved in 40 ml. of methanol and 3 g. of sodium borohydride were added gradually to the stirred solution. Stirring was continued overnight; thereafter, another 1 g. of sodium borohydride was added to the solution. Within 4 hr. the green mixture turned colorless. The solvent was removed under reduced pressure and 300 ml. of water were added to the residue. The mixture was left standing at room temperature for 1 hr. and then was extracted with chloroform. Work-up in the usual manner of the combined chloroform extracts gave an oily residue which was dissolved in ether. Addition of excess isopropanolic hydrogen chloride to the ether solution yielded 2.2 g. of crystalline 2-benzyl-1,2,3,4-tetrahydro-7-methoxy-4-(4-tolyl)isoquinoline hydrochloride, melting point 256°–257°.

EXAMPLE 10

Preparation of 1,2,3,4-tetrahydro-7-methoxy-4-(4-tolyl)-isoquinoline hydrochloride A. A mixture containing 16 g. of 2-benzyl-1,2,3,4-tetrahydro-7-methoxy-4-(4-tolyl)-4-isoquinolinol and 3 g. of 10 percent palladium-on-charcoal catalyst in 300 ml. of glacial acetic acid was hydrogenated at 60° and 300 psi until the hydrogen uptake ceased. The catalyst was removed by filtration and the filtrate was evaporated to dryness under reduced pressure. The residue was dissolved in methanol and the solution was treated with an excess of isopropanolic hydrogen chloride. Addition of ether to this solution yielded 8 g. of crystalline 1,2,3,4-tetrahydro-7-methoxy-4-(4-tolyl)isoquinoline hydrochloride which, after recrystallization from ethanol, had a melting point of 220°–221°.

B. A mixture containing 2.7 g. of 2-benzyl-1,2,3,4-tetrahydro-7-methoxy-4-(4-tolyl)isoquinoline hydrochloride and 1 g. of 10 percent palladium-on-charcoal in 180 ml. of glacial acetic acid was hydrogenated at room temperature and atmospheric pressure until the hydrogen uptake ceased. The catalyst was removed by filtration and washed thoroughly with warm methanol. The filtrate was evaporated to dryness under reduced pressure. The residue was dissolved in warm ethanol and treated with isopropanolic hydrogen chloride. Addition of ether to the solution precipitated crystalline 1,2,3,4-tetrahydro-7-methoxy-4-(4-tolyl)isoquinoline hydrochloride which, after recrystallization from ethanol/ether, had a melting point of 220°–221°.

EXAMPLE 11

Preparation of 7-methoxy-1-methyl-4-phenylisoquinoline hydrochloride and 1,2,3,4-tetrahydro-7-methoxy-1-methyl-4-phenylisoquinoline hydrochloride To a solution containing 6 g. of 2-benzyl-1,2,3,4-terahydro-7-methoxy-1-methyl-4-phenyl-4-isoquinolinol hydrochloride in 250 ml. of glacial acetic acid was added 1 g. of 10 percent palladium-on-charcoal catalyst. The mixture was hydrogenated at 55°–60° and atmospheric pressure for 4 hr., whereupon the hydrogen uptake ceased. The mixture was cooled to room temperature, the catalyst was removed by filtration and the filtrate was evaporated to dryness under reduced pressure. The residue was crystallized from acetone/ether to yield 7-methoxy-1-methyl-4-phenylisoquinoline hydrochloride which, upon recrystallization from isopropanol, had a melting point of 219°–220°.

The crystallization mother liquor was treated with ether to produce an oily precipitate. After decantation of the solvent, it was crystallized from 3N hydrochloric acid to give 1.5 g. of 1,2,3,4-tetrahydro-7-methoxy-1-methyl-4-phenylisoquinoline hydrochloride which, after recrystallization from isopropanol, had a melting of 194°–196°.

EXAMPLE 12

Preparation of 2-benzyl-1,2,3,4-tetrahydro-7-methoxy-4-phenylisoquinoline hydrochloride and 2-benzyl-7-methoxy-4-phenylisoquinolinium chloride A solution containing 7 g. of 2-benzyl-1,2,3,4-tetrahydro-7-methoxy-4-phenyl-4-isoquinolinol hydrochloride in 70 ml. of 20 percent isopropanolic hydrogen chloride was refluxed with stirring for 30 min. After evaporating the solvent under reduced pressure, the residue was crystallized from acetone to yield 3.8 g. of crystalline 2-benzyl-1,2,3,4-tetrahydro-7-methoxy-4-phenylisoquinoline hydrochloride which, after recrystallization from methanol/ether, had a melting point of 258°–259°.

Upon addition of ether to the mother liquor of the crystallized 2-benzyl-1,2,3,4-tetrahydro-7-methoxy-4-phenylisoquinoline hydrochloride, an oil precipitated. After decantation of the solvents, the oil was crystallized from ethanol/ether to yield 2-benzyl-7-methoxy-4-phenylisoquinolinium chloride which, after recrystallization from acetone, had a melting point of 206°–207°.

EXAMPLE 13

Preparation of 2-benzyl-1,2,3,4-tetrahydro-7-methoxy-1-methyl-4-phenylisoquinoline hydrochloride A stirred mixture of 2 g. 2-benzyl-1,2,3,4-tetrahydro-7-methoxy-1-methyl-4-phenyl-4-isoquinolinol hydrochloride in 100 ml. of glacial acetic acid was heated under nitrogen at 100° until a clear solution was obtained and thereafter maintained at 60° for 4.5 hours. After cooling to room temperature, the solvent was removed under vacuum and the oily residue was covered with benzene and allowed to stand at room temperature overnight. A crystalline precipitate was obtained which was recrystallized from acetone to give 0.6 g. of 2-benzyl-1,2,3,4-tetrahydro-7-methoxy-1-methyl-4-phenylisoquinoline hydrochloride, melting point 214°–216°.

EXAMPLE 14

Preparation of 2-benzyl-7-chloro-1,2,3,4-tetrahydro-4-phenylisoquinoline hydrochloride A. A suspension containing 15 g. of 2-benzyl-7-chloro-1,2,3,4-tetrahydro-4-phenyl-4-isoquinolinol hydrochloride in 2.2 l. of a 3:1 mixture of glacial acetic acid and concentrated hydrochloric acid was heated on a steambath until a clear solution was obtained. Heating at 80° was continued for an additional 2 hours and then the mixture was allowed to stand at room temperature overnight. The solvent was removed under reduced pressure. The residue was dried by repeated additions of benzene to the residue followed by evaporation under vacuum. The dry residue was dissolved in 700 ml. of ethanol and 41.7 g. of sodium borohydride were added with stirring while the temperature was maintained between −3° and 23° by cooling with ice. After the addition was complete, stirring was continued for 1.5 hours. The mixture was then diluted with water and extracted twice with chloroform. The residue obtained from the usual work-up of the combined extracts was dissolved in ethanol. Addition of ethanolic hydrogen chloride to the solution produced 9.1 g. of crystalline 2-benzyl-7-chloro-1,2,3,4-tetrahydro-4-phenylisoquinoline hydrochloride, which after recrystallization twice from ethanol/ether had a melting point of 273°–275°.

B. A suspension of 1.93 g. of 2-benzyl-7-chloro-1,2,3,4-tetrahydro-4-phenyl-4-isoquinolinol hydrochloride in 250 ml. of a 3:1 mixture of glacial acetic acid and concentrated hydrochloric acid was heated at 100° for 3 hours to a clear solution. The solution was cooled to room temperature, 200 mg. of platinum oxide were added and the mixture was hydrogenated at atmospheric pressure and room temperature for 20 hours. The catalyst was removed by filtration and the filtrate was evaporated to dryness. The resulting residue was dissolved in methanol. The addition of ether to the solution yielded 788 mg. of crystalline 2-benzyl-7-chloro-1,2,3,4-tetrahydro-4-phenylisoquinoline hydrochloride, melting point 273°–276°.

EXAMPLE 15

Preparation of 7-chloro-1,2,3,4-tetrahydro-2-methyl-4-phenylisoquinoline hydrochloride To a suspension of 9.1 g. of 2-benzyl-7-chloro-1,2,3,4-tetrahydro-4-phenylisoquinoline hydrochloride in water was added excess ammonium hydroxide. The mixture was extracted twice with chloroform to yield an oily free base which, after the usual work-up of the organic extracts, was dissolved in 500 ml. of methanol. After 27 ml. of freshly distilled methyl iodide were added to the solution, the mixture was heated at 80° for 40 hr. Thereafter, the solvent was partially removed under reduced pressure to yield 9.0 g. of crystalline 2-benzyl-7-chloro-1,2,3,4-tetrahydro-2-methyl-4-phenylisoquinolinium iodide, which after recrystallization three times from methanol, had a melting point of 224°–226°.

To a solution containing 8.5 g. of the crude 2-benzyl-7-chloro-1,2,3,4-tetrahydro-2-methyl-4-phenylisoquinolinium iodide in 1 l. of methanol were added 2.5 g. of 10 percent palladium-on-carbon catalyst. Then, the mixture was hydrogenated with shaking at atmospheric pressure and room temperature until hydrogen uptake ceased. After removal of the catalyst by filtration and evaporation of the filtrate to dryness, the residue was suspended in water, excess ammonium hydroxide was added, and the mixture was extracted twice with chloroform. The residue obtained after usual work-up of the combined extracts was dissolved in methanol. Excess isopropanolic hydrogen chloride was added, and the solvents were removed. The oily residue treated with acetone, yielded 3.2 g. of crystalline 7-chloro-1,2,3,4-tetrahydro-2-methyl-4-phenylisoquinoline hydrochloride, which after recrystallization from ethanol/ether and from methanol/ether had a melting point of 253°–255°.

EXAMPLE 16

Preparation of 1,2,3,4-tetrahydro-7-methoxy-2-methyl-4-phenylisoquinoline hydrochloride A mixture of 0.65 g. of 1,2,3,4-tetrahydro-7-methoxy-4-phenylisoquinoline, 1 ml. of formic acid (98–100 percent) and 0.66 ml. of formaldehyde solution (37 percent) was refluxed for 8 hr. After cooling the solution to room temperature, 20 ml. of 6N hydrochloric acid were added and the solvent was evaporated under reduced pressure. The residue was dissolved in water and made alkaline by adding a saturated aqueous solution of sodium carbonate. The free base thus liberated was extracted with ether. The combined ethereal extracts after washing with water were dried over sodium sulfate and filtered. Upon addition of isopropanolic hydrogen chloride to the filtrate, 0.63 g. of crystalline 1,2,3,4-tetrahydro-7-methoxy-2-methyl-4-phenylisoquinoline hydrochloride was obtained, which after recrystallization from ethanol had a melting point of 236°–237°.

EXAMPLE 17

Preparation of 1,2,3,4-tetrahydro-7-methoxy-1,2-dimethyl-4-phenylisoquinoline hydrochloride A mixture of 1 g. of 1,2,3,4-tetrahydro-7-methoxy-1-methyl-4-phenylisoquinoline, 1.82 ml. of formic acid (98–100 percent) and 1.14 ml. of formaldehyde (37 percent) were heated at 105° for 8 hr. To the cooled mixture were added 40 ml. of 6N hydrochloric acid and the solvent then was removed under reduced pressure. The residue was dissolved in water and made alkaline by adding a saturated aqueous solution of sodium carbonate. The mixture was extracted with ether, the ethereal extracts were combined, washed with water, dried over sodium sulfate and filtered. Addition of isopropanolic hydrogen chloride to the filtrate gave 1.2 g. of crystalline 1,2,3,4-tetrahydro-7-methoxy-1,2-dimethyl-4-phenylisoquinoline hydrochloride which, after recrystallization from ethanol/ether, had a melting point of 233°–234°.

EXAMPLE 18

Preparation of 1,2,3,4-tetrahydro-7-methoxy-2-methyl-4-(4-tolyl)-isoquinoline hydrochloride A mixture of 1.1 g. of 1,2,3,4-tetrahydro-7-methoxy-4-(4-tolyl)isoquinoline, 1.5 ml. of formic acid (98–100 percent) and 0.8 ml. of formaldehyde (37 percent) was heated at 100°–105° for 8 hr. After cooling the mixture to room temperature, 20 ml. of 6N hydrochloric acid were added which was followed by removal of the solvents under vacuum. The residue was dissolved in water, the solution was made alkaline by addition of sodium bicarbonate and extracted with chloroform. The residue obtained after the usual work-up of the combined organic extracts was dissolved in methanol and treated with isopropanolic hydrogen chloride. Addition of ether to the solution gave crystalline 1,2,3,4-tetrahydro-7-methoxy-2-methyl-4-(4-tolyl)isoquinoline hydrochloride which, after recrystallization from ethanol/ether, had a melting point of 244°–245°.

EXAMPLE 19

Preparation of 1,2,3,4-tetrahydro-7-hydroxy-2-methyl-4-phenyl-isoquinoline hydrochloride A solution containing 13.5 g. of 1,2,3,4-tetrahydro-7-methoxy-2-methyl-4-phenylisoquinoline hydrochloride in 200 ml. of 48 percent aqueous hydrobromic acid was heated at 120° for 10 hrs. after which time the solvent was removed under reduced pressure. Water and chloroform were added to the residue and excess ammonium hydroxide was dropped into the mixture with stirring. The chloroform layer was separated and the aqueous part was extracted three times with chloroform. The residue obtained from the combined chloroform solution after the usual work-up was dissolved in warm ethanol. Addition of excess isopropanolic hydrogen chloride to the solution gave 9.6 g. of crystalline material, melting point 246°–248°. This material was converted into the free base by dissolution in water, addition of excess ammonium hydroxide, extraction of the aqueous mixture with chloroform and work-up of the organic extracts. From the free base thus obtained, 3.5 g. were chromatographed on 150 g. of silica gel (Grace-Davison, Grade 923). With a mixture of benzene-ethyl acetate (8:2) 2.94 g. of oily material were eluted. This was dissolved in ethanol and addition of ethanolic hydrogen chloride gave 1.3 g. of crystalline 1,2,3,4-tetrahydro-7-hydroxy-2-methyl-4-phenylisoquinoline hydrochloride, which after recrystallization from ethanol, had a melting point of 261°–267°.

EXAMPLE 20

Preparation of 1,2,3,4-Tetrahydro-7-methoxy-4($\underline{S}$)-phenylisoquino-line di-O-isopropylidene-2-keto-L-gulonate.

A mixture of 16.6 g. (70 mmoles) of 1,2,3,4-tetrahydro-7-methoxy-4-phenylisoquinoline, 20.3 g (70 mmoles) of di-O-isopropylidene-2-keto-L-gulonic acid hydrate and 60 ml of ethanol (95 percent) was heated on a steambath until solution occurred. Undisturbed cooling overnight gave the crude salt. The product was recrystallized from ethyl acetate (400 ml) to give pure 1,2,3,4-tetrahydro-7-methoxy-4($\underline{S}$)-phenylisoquinoline di-O-isopropylidine-2-keto-L-gulonate, mp 172°–174°, $[\alpha]_D^{25} - 16.8°$ ($\underline{C}$ 1.08 methanol).

EXAMPLE 21

Preparation of 1,2,3,4-Tetrahydro-7-methoxy-4($\underline{R}$)-phenylisoquino-line dibenzoyl-d-tartrate A. The filtrates obtained in the preparation of example 20 were concentrated to dryness. The residue was suspended in water and treated with concd ammonium hydroxide. The resulting suspension was extracted with ether and the combined extracts were dried over magnesium sulfate. Removal of the solvent gave crude 1,2,3,4-tetrahydro-7-methoxy-4($\underline{R}$)-phenylisoquinoline. Part of the product (5g; 21 mmoles) was heated with a solution of 5.2 g (15 mmoles) of dibenzoyl-d-tartaric acid in 10 ml of acetone until dissolved. The solution was allowed to stand at room temperature for 24 hours. The material which separated was collected by filtration and recrystallized from ethanol to give pure 1,2,3,4-tetrahydro-7-methoxy-4($\underline{R}$)-phenylisoquinoline dibenzoyl-d-tartrate mp 167°–169°, $[\alpha]_D^{25} - 60.4°$ ($\underline{C}$ 1.21, methanol).

B. An aqueous suspension of the hydrochloride of 1,2,3,4-tetrahydro-7-methoxy-4-phenylisoquinoline (130 g, 0.47 mole) was rendered alkaline with 6$\underline{N}$ sodium hydroxide and extracted with dichloromethane. The combined organic layer was washed with water, dried (Na$_2$SO$_4$) and evaporated to dryness. The oily free base 1,2,3,4-tetrahydro-7-methoxy-4-phenylisoquinoline thus obtained was dissolved in 250 ml of 3A-ethanol and combined with a solution of 170 g (0.47 mole) of dibenzoyl-d-tartaric acid in 400 ml of 3A-ethanol. On standing at room temperature crystalline material separated which after recrystallization from 3A-ethanol gave pure 1,2,3,4-tetrahydro-7-methoxy-4($\underline{R}$)-phenylisoquinoline dibenzoyl-d-tartrate, mp 167°–169°, $[\alpha]_D^{25.5} - 61.8°$ ($\underline{C}$ 1.17, methanol).

EXAMPLE 22

Preparation of 1,2,3,4-Tetrahydro-7-methoxy-4($\underline{S}$)-phenylisoquino-line dibenzoyl-l-tartrate The filtrates of the preparation of 1,2,3,4-tetrahydro-7-methoxy-4($\underline{R}$)-phenylisoquinoline dibenzoyl-d-tartrate (Example 21 - Method B) were combined and evaporated to dryness. An aqueous suspension of the residue was rendered alkaline with 6N sodium hydroxide and extracted with dichloromethane. The combined organic layer was washed with water, dried (Na$_2$SO$_4$) and evaporated to dryness. The residue was dissolved in 125 ml of 3A-ethanol and combined with a solution of 81.5 g of dibenzoyl-$\underline{L}$-tartaric acid in 200 ml of 3A-ethanol. On standing at room temperature, crude crystalline 1,2,3,4-tetrahydro-7-methoxy-4(S)-phenylisoquinoline dibenzoyl-L-tartrate separated. The material was collected by filtration and recrystallization from methanolethanol gave pure 1,2,3,4-tetrahydro-7-methoxy-4(S)-phenylisoquinoline dibenzoyl-L-tartrate, mp 167°–169°, $[\alpha]_D^{26} + 62.4°$ (C 1.14, methanol).

EXAMPLE 23

Preparation of 1,2,3,4-Tetrahydro-7-methoxy-4(R)-phenylisoquinoline and Hydrochloride.

A suspension of 103.8 g of the 1,2,3,4-tetrahydro-7-methoxy-4(R)-phenylisoquinoline dibenzoyl-d-tartrate in water was rendered alkaline with excess 6N sodium hydroxide and extracted several times with dichloromethane. The combined organic layer was washed with water, dried ($Na_2SO_4$) and evaporated to dryness. The residue was dried at room temperature under reduced pressure overnight to yield 1,2,3,4-tetrahydro-7-methoxy-4(R)-phenylisoquinoline as a liquid, $[\alpha]_D^{24} + 10.1°$ (C 1.16, methanol).

A sample of the free base on treatment with anhydrous hydrogen chloride in ether afforded the crude hydrochloride. Recrystallization from ethanol gave pure 1,2,3,4-tetrahydro-7-methoxy-4(R)-phenylisoquinoline hydrochloride, mp 237°–239°, $[\alpha]_D^{25} + 14.3°$ (C 1.05, methanol).

EXAMPLE 24

Preparation of 1,2,3,4-Tetrahydro-7-methoxy-4(S)-phenylisoquinoline and Hydrochloride.

A. A suspension of 53.3 g of the 1,2,3,4-tetrahydro-7-methoxy-4(S)-phenylisoquinoline dibenzoyl-l-tartrate in water was rendered alkaline with excess 6N sodium hydroxide and extracted several times with ether. The combined ethereal layer was washed with water, dried ($Na_2SO_4$) and evaporated to dryness under reduced pressure to give 1,2,3,4-tetrahydro-7-methoxy-4(S)-phenylisoquinoline as liquid material. $[\alpha]_D^{24} - 9.8°$ (C 1.65, methanol).

B. 3.1 g of 1,2,3,4-tetrahydro-7-methoxy-4(S)-phenylisoquinoline di-O-isopropylidene-2-keto-L-gulonate in 20 ml of water was decomposed by addition of concentrated ammonium hydroxide. The resulting suspension was extracted with chloroform (3 × 20 ml) and the combined extract was dried. Removal of the solvent gave 1,2,3,4-tetrahydro-7-methoxy-4(S)-phenylisoquinoline.

A sample of the above free base on treatment with anhydrous chloride in ether afforded the crude hydrochloride. Recrystallization from ethanol gave pure 1,2,3,4-tetrahydro-7-methoxy-4(S)-phenylisoquinoline hydrochloride, mp 237°–239°. $[\alpha]_D^{25} - 15.4°$ (C 1.01, methanol).

EXAMPLE 25

Preparation of 1,2,3,4-Tetrahydro-7-methoxy-2-methyl-4(S)-phenylisoquinoline, hydrochloride and hydroiodide.

A mixture of 20 g of 1,2,3,4-tetrahydro-7-methoxy-4(S)-phenylisoquinoline, 30 ml of formic acid (98–100 percent) and 20 ml of formaldehyde solution (37 percent) was refluxed for 20 hr. To the cooled solution was added 500 ml of 6N hydrochloric acid. The solvents were evaporated under reduced pressure and the solid residue was recrystallized from ethanol to afford 1,2,3,4-tetrahydro-7-methoxy-2-methyl-4(S)-phenylisoquinoline hydrochloride, mp 240°–244°, $[\alpha]_D^{25.2} - 11.8°$ (C 0.97, methanol).

A solution of hydrochloride of 1,2,3,4-tetrahydro-7-methoxy-2-methyl-4(S)-phenylisoquinoline (100 mg) in water was rendered alkaline with ammonium hydroxide and the liberated free base was extracted with ether (3x). The combined organic extract was washed with water, dried ($Na_2SO_4$) and evaporated to dryness. The residue was dried at room temperature under reduced pressure for 15 hr. The 1,2,3,4-tetrahydro-7-methoxy-2-methyl-4(S)-phenylisoquinoline thus obtained was a clear liquid, $[\alpha]_D^{23} + 7.20$ (C 0.1948, methanol).

To 5 ml of a methanolic solution of the free base 1,2,3,4-tetrahydro-7-methoxy-2-methyl-4(S)-phenylisoquinoline obtained as described above was added excess aqueous hydroiodic acid (55–58 percent). On standing crystalline material separated which was collected by filtration. Recrystallization from 5 ml of hot acetone gave pure 1,2,3,4-tetrahydro-7-methoxy-2-methyl-4(S)-phenylisoquinoline hydroiodide, mp 227°–228°, $[\alpha]_D^{23} - 7.4°$ (C 0.212, methanol).

EXAMPLE 26

Preparation of 1,2,3,4-Tetrahydro-7-methoxy-2-methyl-4(R)-phenylisoquinoline and hydrochloride.

A solution of 1.62 g of 1,2,3,4-tetrahydro-7-methoxy-4(R)-phenylisoquinoline in a mixture of 2.5 ml of formic acid and 1.7 ml of formaldehyde (37 percent) was kept at reflux overnight. To the cooled solution was added 40 ml of 6N hydrochloric acid followed by removal of the solvent under reduced pressure. The residue was dissolved in water, the aqueous solution was rendered alkaline with excess 2N sodium carbonate and the free base was extracted with ether (3x). The combined organic extract was washed with water, dried ($Na_2SO_4$) and evaporated to dryness. The oily residue on addition of excess ethanolic hydrogen chloride gave crystalline 1,2,3,4-tetrahydro-7-methoxy-2-methyl-4(R)-phenylisoquinoline hydrochloride mp 229°–239°. Recrystallization from ethanol afforded pure 1,2,3,4-tetrahydro-7-methoxy-2-methyl-4(R)-phenylisoquinoline hydrochloride, mp 238°–243°, $[\alpha]_D^{25.2} + 11.5°$ (C 1.0, methanol).

A sample of the hydrochloride (100 mg) was converted into the free base as described in Example 32 to afford 1,2,3,4-tetrahydro-7-methoxy-2-methyl-4(R)-phenylisoquinoline as a clear liquid, $[\alpha]_D^{23} - 7.1°$ (C 0.3604, methanol).

EXAMPLE 27

Preparation of 3,4-Dihydro-7-methoxy-2-methyl-4(S)-phenylisoquinolinium perchlorate.

To a solution of 4.2 g (16 mmole) of 1,2,3,4-tetrahydro-7-methoxy-2-methyl-4(S)-phenylisoquinoline in 100 ml of 50 percent aqueous acetic acid was added a solution of 20.4 g (64 mmole) of mercuric acetate in 150 ml of glacial acetic acid. The mixture was stirred at 70° under a nitrogen atmosphere for 15 hr. The precipitated mercurous acetate was removed by filtration and a slow stream of hydrogen sulfide was passed through the filtrate. After removal of black precipitate by filtration the filtrate was evaporated to dryness under reduced pressure. The residue was dissolved in ethanolic hydrogen chloride. Addition of ether to the solution precipitated the hydrochloride of the unreacted starting material. The filtrate was evaporated to dryness and the residue was treated with an excess of 60 percent aqueous perchloric acid to give a crystalline precipitate. The supernatant solution was decanted, the crystalline material was washed with water and collected by filtration to give 3,4-dihydro-7-methoxy-2-methyl-4(S)-phenylisoquinolinium perchlorate, which upon recrystallization from ethanol had a melting point of 170°–172°.

EXAMPLE 28

Preparation of 1,2,3,4-Tetrahydro-7-methoxy-1(S),2-dimethyl-4(S)-phenylisoquinoline and 1,2,3,4-tetrahydro-7-methoxy-1(R),2-dimethyl-4(S)-phenylisoquinoline.

To a concentrated ether solution of methylmagnesium iodide, prepared from 0.97 g (40 mmole) of magnesium and 5.68 g (40 mmole) of methyliodide, 1.41 g (40 mmole) of 3,4-dihydro-7-methoxy-2-methyl-4(S)-phenylisoquinolinium perchlorate was added in small portions. The mixture was stirred at room temperature for 2 hr. and then slowly poured onto an aqueous ice-ammonium chloride mixture. The suspension was extracted twice with ether. The ethereal layers were combined, washed with water, dried over anhydrous sodium sulfate and evaporated to dryness to give a residue. Part of the residue (300 mg) was purified by preparative thin layer chromatography on silica gel (DSF-5, Camag) with ethyl acetategammonium hydroxide (99:1) as the mobile phase. Two major zones were removed from the plates and each was eluted with dichloromethane. The zone with larger $R_f$-valvue gave the trans-derivative 1,2,3,4-tetrahydro-7-methoxy-1(S),2-dimethyl-4(S)-phenylisoquinoline. The other zone afforded the cis-derivative 1,2,3,4-tetrahydro-7-methoxy-1(R), 2-dimethyl-4(S)-phenylisoquinoline.

EXAMPLE 29

1,2,3,4-Tetrahydro-7-methoxy-2-methyl-4-phenylisoquinoline hydrochloride.

Capsule Formulation

| | Per Capsule |
|---|---|
| 1,2,3,4-tetrahydro-7-methoxy-2-methyl-4-phenylisoquinoline hydrochloride | 10 mg |
| Lactose, U.S.P. | 165 mg |
| Corn Starch, U.S.P. | 30 mg |
| Talc, U.S.P. | 5 mg |
| Total Weight | 210 mg |

Procedure:
1. 1,2,3,4-Tetrahydro-7-methoxy-2-methyl-4-phenylisoquinoline hydrochloride, lactose and corn starch were mixed in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into No. 4 hard shell gelatin capsules on a Parke Davis capsulating machine. (Any similar type capsulating machine may be used).

EXAMPLE 30

1,2,3,4-Tetrahydro-7-methoxy-2-methyl-4-phenylisoquinoline hydrochloride.

Tablet Formulation

| | Per Tablet |
|---|---|
| 1,2,3,4-Tetrahydro-7-methoxy-2-methyl-4-phenylisoquinoline hydrochloride | 25.00 mg |
| Dicalcium Phosphate Dihydrate, Unmilled | 175.00 mg |
| Corn Starch | 24.00 mg |
| Magnesium Sterate | 1.00 mg |
| Total Weight | 225.00 mg |

Procedure:
1. 1,2,3,4-Tetrahydro-7-methoxy-2-methyl-4-phenylisoquinoline hydrochloride and corn starch were mixed together and passed through an No. 00 screen in Model "J" Fitzmill with hammers forward.
2. This premix was then mixed with dicalcium phosphate and one-half of the magnesium sterate, passed through a No. 1A screen in Model "J" Fitzmill with knives forward, and slugged.
3. The slugs were passed through a No. 2A plate in a Model "D" Fitzmill at slow speed with knives forward, and the remaining magnesium sterate was added.
4. The mixture was mixed and compressed.

EXAMPLE 31

1,2,3,4-Tetrahydro-7-methoxy-2-methyl-4-phenylisoquinoline hydrochloride.

Suppository Formulation

| | Per 1.3 Gm Suppository |
|---|---|
| 1,2,3,4-Tetrahydro-7-methoxy-2-methyl-4-phenylisoquinoline hydrochloride | 0.010 Gm |
| Wecobee M* | 1.245 Gm |
| Carnauba Wax | 0.045 Gm |

*E. F. Drew Company 522 Fifth Avenue New York, New York

Procedure:
The Wecobee M and the carnauba wax were melted in a suitable size glass-lined container (stainless steel may also be used), mixed well and cooled to 45°C.
2. The 1,2,3,4-Tetrahydro-7-methoxy-2-methyl-4-phenylisoquinoline hydrochloride, which had been reduced to a fine powder with no lumps, was added and stirred until completely and uniformly dispersed.
3. The mixture was poured into suppository molds to yield suppositories having an individual weight of 1.3 Grams.
4. The suppositories were cooled and removed from molds. They were then individually wrapped in wax paper for packaging (foil may also be used).

EXAMPLE 32

1,2,3,4-Tetrahydro-7-methoxy-2-methyl-4-phenylisoquinoline hydrochloride.

Parenteral Formulation

| | per cc | |
|---|---|---|
| 1,2,3,4-Tetrahydro-7-methoxy-2-methyl-4-phenylisoquinoline hydrochloride | 5.0 | mg |
| Propylene Glycol | 0.4 | cc |
| Benzyl Alcohol (Benzaldehyde free) | 0.015 | cc |
| Ethanol 95 per cent U.S.P. | 0.10 | cc |
| Sodium Benzoate | 48.8 | mg |
| Benzoic Acid | 1.2 | mg |
| Water for Injection q.s. | 1.0 | cc |

Procedure (For 10,000 cc):
1. The 50 Grams of 1,2,3,4-Tetrahydro-7-methoxy-2-methyl-4-phenylisoquinoline hydrochloride were dissolved in 150 cc of benzyl alcohol; 4,000 cc of propylane glycol and 1,000 cc of ethanol were added.
2. The 12 grams of benzoic acid were dissolved in the above. The 48.8 grams of sodium benzoate dissolved in 3000 cc of water for injection were added. The solution was brought up to final volume of 10,000 cc with water for injection.
3. The solution was filtered through an 02 Selas candle, filled into suitable size ampuls, gassed with $N_2$ and sealed. It was then autoclaved at 10 psi for 30 minutes.

EXAMPLE 33

In a similar fashion as described in Examples 29-32, the following compounds may be formulated into capsule, tablet, suppository or parenteral preparations:

1,2,3,4-tetrahydro-1,2-dimethyl-7-methoxy-4-phenlisoquinoline hydrochloride;

1,2,3,4-tetrahydro-7-methoxy-4-phenlisoquinoline hydrochloride;

1,2,3,4-tetrahydro-7-methoxy-2-methyl-4-(4-tolyl)-isoquinoline hydrochloride;

1,2,3,4-tetrahydro-7-hydroxy-2-methyl-4-phenlisoquinoline hydrochloride.

1,2,3,4-tetrahydro-7-methoxy-2-methyl-4-(S)-phenlisoquinoline;

1,2,3,4-tetrahydro-7-methoxy-2-methyl-4-(R)-phenlisoquinoline;

1,2,3,4-tetrahydro-7-methoxy-4(S)-phenlisoquinoline.

We claim:
1. 1,2,3,4-tetrahydro-7-hydroxy-2-methyl-4-phenylisoquinoline.
2. 1,2,3,4-tetrahydro-7-methoxy-1,2-dimethyl-4-phenylisoquinoline.

3. 1,2,3,4-tetrahydro-7-methoxy-2-methyl-4-(4-tolyl)-isoquinoline.
4. 1,2,3,4-tetrahydro-7-methoxy-2-methyl-4-phenylisoquinoline.
5. 1,2,3,4-tetrahydro-7-methoxy-2-methyl-4(S)-phenylisoquinoline.
6. 1,2,3,4-tetrahydro-7-methoxy-2-methyl-4(R)-phenylisoquinoline.
7. 1,2,3,4-tetrahydro-7-methoxy-4(S)-phenylisoquinoline.
8. 1,2,3,4-tetrahydro-7-methoxy-4(R)-phenylisoquinoline.
9. A process for the preparation of compounds of the formula

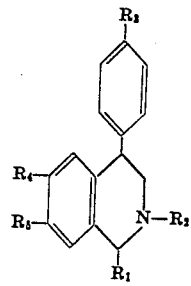

wherein $R_1$ is selected from the group consisting of hydrogen and lower alkyl having from 1-7 carbon atoms;
$R_2$ is selected from the group consisting of hydrogen, lower alkyl having from one to seven carbon atoms and benzyl;
$R_3$ is selected from the group consisting of hydrogen and lower alkyl having from one to seven carbon atoms;
$R_4$ is selected from the group consisting of hydrogen and lower alkoxy having from one to seven carbon atoms; and
$R_5$ is selected from the group consisting of hydrogen, halogen, hydroxy and lower alkoxy having from one to seven carbon atoms;
at least one of $R_1$–$R_5$ being other than hydrogen
which comprises treating a compound of the formula

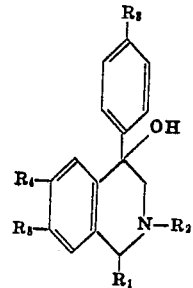

wherein $R_1$–$R_5$ are as described above
with a catalytic hydrogenating agent selected from the group consisting of platinum oxide, a mixture of platinum oxide and platinum black, rhodium (5 percent) on alumina, rhodium (5 percent) on carbon and palladium (10 percent) on carbon in the presence of an acidic solvent selected from the group consisting of glacial acetic acid, hydrochloric acid, ethanolic hydrogen chloride, isopropanolic hydrogen chloride or a mixture of glacial acetic acid and hydrochloric acid.
10. The process of claim 9 wherein said catalytic hydrogenating agent is palladium (10 percent) on carbon.

* * * * *

UNITED STATES PATENT OFFICE
CERTIFICATE OF CORRECTION

Patent No. 3,666,763                    Dated May 30, 1972

Inventor(s)    Grethe and Uskokovic

It is certified that error appears in the above-identified patent and that said Letters Patent are hereby corrected as shown below:

Column 17, line 5 of Claim 5

$\quad\quad\quad$ 4 (S)    should be   4($\underline{S}$)

Column 17, line 7 of Claim 6

$\quad\quad\quad$ 4 (R)    should be  4 ($\underline{R}$)

Column 17, line 9 of Claim 7

$\quad\quad\quad$ 4 (S)    should be  4($\underline{S}$)

Column 17, line 10 of Claim 8

$\quad\quad\quad$ 4 (R)    should be  4($\underline{R}$)

Signed and sealed this 1st day of May 1973.

(SEAL)
Attest:

EDWARD M. FLETCHER, JR.            ROBERT GOTTSCHALK
Attesting Officer                  Commissioner of Patents